US009104979B2

(12) United States Patent
Kiciman et al.

(10) Patent No.: US 9,104,979 B2
(45) Date of Patent: Aug. 11, 2015

(54) ENTITY RECOGNITION USING PROBABILITIES FOR OUT-OF-COLLECTION DATA

(75) Inventors: Emre Kiciman, Seattle, WA (US); Abulimiti Aji, Atlanta, GA (US); Kuansan Wang, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 114 days.

(21) Appl. No.: 13/162,563

(22) Filed: Jun. 16, 2011

(65) Prior Publication Data

US 2012/0323839 A1 Dec. 20, 2012

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| | | | |
|---|---|---|---|
| 7,333,966 B2* | 2/2008 | Dozier | 706/21 |
| 7,386,545 B2 | 6/2008 | Ashutosh et al. | |
| 7,672,833 B2 | 3/2010 | Blume et al. | |
| 7,970,808 B2* | 6/2011 | Konig et al. | 707/962 |
| 2007/0065003 A1* | 3/2007 | Kellerman et al. | 382/159 |
| 2010/0293195 A1* | 11/2010 | Houghton | 707/776 |

OTHER PUBLICATIONS

Dredze, Mark, et al. "Entity disambiguation for knowledge base population." Proceedings of the 23rd International Conference on Computational Linguistics. Association for Computational Linguistics, 2010.*
Han, Xianpei, and Jun Zhao. "Named entity disambiguation by leveraging wikipedia semantic knowledge." Proceedings of the 18th ACM conference on Information and knowledge management. ACM, 2009.*
Malin, Bradley. "Unsupervised name disambiguation via social network similarity." Workshop on link analysis, counterterrorism, and security. vol. 1401. 2005.*
Taffet, M. "Looking ahead to person resolution." Proceedings of the 4th Annual Workshop on Technology for Family History and Genealogical Research. 2004.*
Wan, et al., "Person Resolution in Person Search Results: WebHawk", Retrieved at <<http://research.microsoft.com/en-us/um/people/jfgao/paper/cf440-wan.pdf>>, Proceedings of the 14th ACM international conference on Information and knowledge management, Oct. 31-Nov. 4, 2005, pp. 8.
Kalashnikov, et al., "Web People Search via Connection Analysis", Retrieved at <<http://ieeexplore.ieee.org/stamp/stamp.jsp?tp=&arnumber=4497193>>, IEEE Transactions on Knowledge and Data Engineering, vol. 20 No. 11, Nov. 2008, pp. 1550-1565.

(Continued)

*Primary Examiner* — Kakali Chaki
*Assistant Examiner* — Daniel Pellett
(74) *Attorney, Agent, or Firm* — Steve Wight; Doug Barker; Micky Minhas

(57) ABSTRACT

A classifier that disambiguates among entities based on a dictionary, such as corpus of documents about those entities, is built by incorporating probabilities that an entity exists that is not in the dictionary. Given a document it is associated by the classifier with an entity. By incorporating out of collection probabilities into the classifier, a higher level of confidence in the match between an entity and a document is achieved.

20 Claims, 5 Drawing Sheets

(56) References Cited

OTHER PUBLICATIONS

Vu, et al., "Disambiguation of People in Web Search Using a Knowledge Base", Retrieved at <<http://ieeexplore.ieee.org/stamp/stamp.jsp?tp=&arnumber=4223072>>, IEEE International Conference on Research, Innovation and Vision for the Future, Mar. 5-9, 2007, pp. 185-191.

Bekkerman, et al., "Disambiguating Web Appearances of People in a Social Network", Retrieved at <<http://citeseerx.ist.psu.edu/viewdoc/download;jsessionid=7AEFC7B4C460BEDA00AAC3E658E69AAB?doi=10.1.1.59.3154&rep=rep1&type=pdf>>, Proceedings of the 14th international conference on World Wide Web, May 10-14, 2005, pp. 463-470.

Yoshida, et al., "Person Name Disambiguation by Bootstrapping", Retrieved at <<http://140.122.184.128/presentation/10-11-23/Person%20Name%20Disambiguation%20by%20Bootstrapping.pdf>>, Proceeding of the 33rd international ACM SIGIR conference on Research and development in information retrieval, Jul. 19-23, 2010, pp. 10-17.

\* cited by examiner

ENTITY RECOGNITION USING PROBABILITIES FOR OUT-OF-COLLECTION DATA

BACKGROUND

A challenge in searching for information about people and other entities in large document sets, such as the Internet, is recognizing an entity and disambiguating that entity from others. Entities include, but are not limited to, people, organizations, locations and the like and typically are represented in language using a proper noun. Often, a proper noun phrase is ambiguous, and may represent several different entities. The entity which is most likely being represented is disambiguated based on context.

Most search engines, especially those generally available over the internet, do not provide any disambiguation and simply return to the user a list of documents that contain query terms. This kind of result requires the user to sort out which documents are relevant. For example, a search for "Michael Jordan" can provide results about a basketball player or a statistics professor. A search for "Michael Smith" can find documents related to any of thousands of people.

Some systems attempt to disambiguate entities by clustering document sets based on the context in which an entity appears. For example, in a set of documents containing the words "Michael Jordan," all documents that contain similar basketball related words might be grouped together to represent one "Michael Jordan," while all documents that contain words related to statistics and machine learning might be grouped together to represent another "Michael Jordan."

Other systems attempt to disambiguate entities by reference to one or more external dictionaries of entities. In such systems, an entity's context is compared to possible matching entities in the dictionary and the closest match is returned. For example, documents about the business activities of Michael Jordan and documents about the basketball career of Michael Jordan could both be matched to the same Michael Jordan in the dictionary, even though the two sets of documents may not have many terms in common with each other.

In both clustering-based systems and dictionary-based systems, a variety of context based information can be used to disambiguate entities in documents, such as: whether documents are on the same web site, other words in the documents, inferred relationships with other entities, document similarity metrics, and the like. For example, the relationship of an entity to other entities can serve to disambiguate one entity from another. For example, if a document includes a reference to one person, e.g., "Michael Jordan," and also refers to another entity, e.g., "Chicago Bulls" as his team, then a "Michael Jordan" in another document also referring to "Chicago Bulls" can be considered the same "Michael Jordan."

A problem associated with clustering-based techniques is that sometimes contextual information needed to disambiguate entities is not present in the context, leading to incorrectly disambiguated results. For example, documents about the same entity in different contexts may not be clustered together even though they refer to the same entity. For example, Michael Jordan the basketball player is also an active businessperson. Documents about his business activities might not be clustered together with documents about his basketball career, despite the fact that both clusters of documents are referring to the same Michael Jordan. Similarly, documents about different entities in the same or superficially similar contexts may be incorrectly clustered together. For example, documents about the statistics professor Michael Jordan might be incorrectly clustered together with documents about the basketball statistics of Michael Jordan the basketball player.

A problem associated with current dictionary-based techniques stems from the fact that no dictionary can contain a complete representation of the world's entities. Thus, if a document's context is matched to an entity in the dictionary, then the technique has identified only the most similar entity in the dictionary, and not necessarily the correct entity, which may be outside the dictionary.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A dictionary of documents is used to define a mapping of entities to terms related to those entities. This dictionary may be a corpus of documents associated with specific entities, a set of profiles of people and businesses in an online directory, articles in an encyclopedia, or other collection of documents associated with entities. A term can be a token, word, phrase, profile feature, relationship to another person or entity, or the like. This mapping of entities to related terms is used to disambiguate ambiguous references to entities in a document.

However, given any dictionary, there is a probability that the disambiguation is not correct because of entities that are not referenced in the dictionary. Thus, if a document is associated with a particular entity due to related terms occurring in the document, then this classification has a probability of being incorrect that depends on how common the entity name and the related terms are in the population covered by the collection of documents, versus how significant a sample of the population the collection represents. The likelihood that a classification is correct is calculated based on the "out-of-collection" probability, an estimate of the population that is not covered by the dictionary. For example, consider a dictionary of 1 million people and their related terms which includes 1000 "Michael Smith" entities. If the set of 1 million people in this dictionary is a sample of 300 million people, then one can estimate that there are 300,000 "Michael Smith" entities in the larger population. The likelihood that a document is correctly associated with any of the Michael Smith entities from the dictionary is only 1:300. The likelihood that a document is associated with any single "Michael Smith" is only 1:300000. As additional related terms are taken into account, the likelihood probability can be improved. For example, if the document being analyzed includes the terms Florida and golf, and the dictionary includes 20,000 people from Florida, and 15,000 people who enjoy golf, then our out-of-collection probability is recalculated to estimate how many entities in the larger population are likely named "Michael Smith", live in Florida and enjoy golf. Assuming independence of terms, the likelihood of a document being associated with a golf-loving "Michael Smith" in Florida in our dictionary is now 1:90. This likelihood can further be improved using additional related terms until a high confidence is achieved.

Thus, a classifier that disambiguates among entities based on a dictionary, such as a corpus of documents about those entities, is built by incorporating probabilities that an entity exists that is not in the dictionary. Given a document it is associated by the classifier with an entity. By incorporating out of collection probabilities into the classifier, a higher level of confidence in the match between an entity and a document is achieved.

Building a classifier for associating an entity with a document begins with a dictionary that maps entities to their related terms. Given a dictionary, building a classifier involves partitioning the dictionary by entity name to provide a set of partitions such that all entities sharing the same name or similar names are in the same partition. A probability that an entity, which has the entity name for a partition, is not represented in the dictionary is estimated. A classifier is created for the partition including the estimated probability.

A document can be associated with a specific entity using such a classifier. For example, the classifier associated with an entity name in the document can be accessed. The classifier incorporates an estimated probability that an entity having the entity name for a partition is not represented in the dictionary. The classifier is applied to the document to obtain probabilities that the document is associated with specific entities having the entity name. A specific entity can be selected according to these probabilities.

The classifier can be a decision tree. The decision tree can include at least one node having a probability incorporating the estimated number of "out-of-collection" entities having the entity name for a partition, but which are not represented in the dictionary. In a decision tree, each node $n_i$ tests some feature $f_i$. These features can also be incorporated to estimate the number of "out-of-collection" entities having the entity name for the partition and matching all the features $f_i$ for a node and its parents. The estimate of the number of "out-of-collection" entities can be computed by $|G|P(name)\Pi_{f \in F}P(f)$, where $|G|$ is the estimated size of the larger population, both including and in addition to the corpus, P(name) is the probability of an entity having the same name, and P(f) is the estimate that an entity passing the feature test f and F is the set of features relevant to a given node in the decision tree (i.e., the feature tests used by a node and its parents).

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which entity classification can be implemented.

Figure 1:
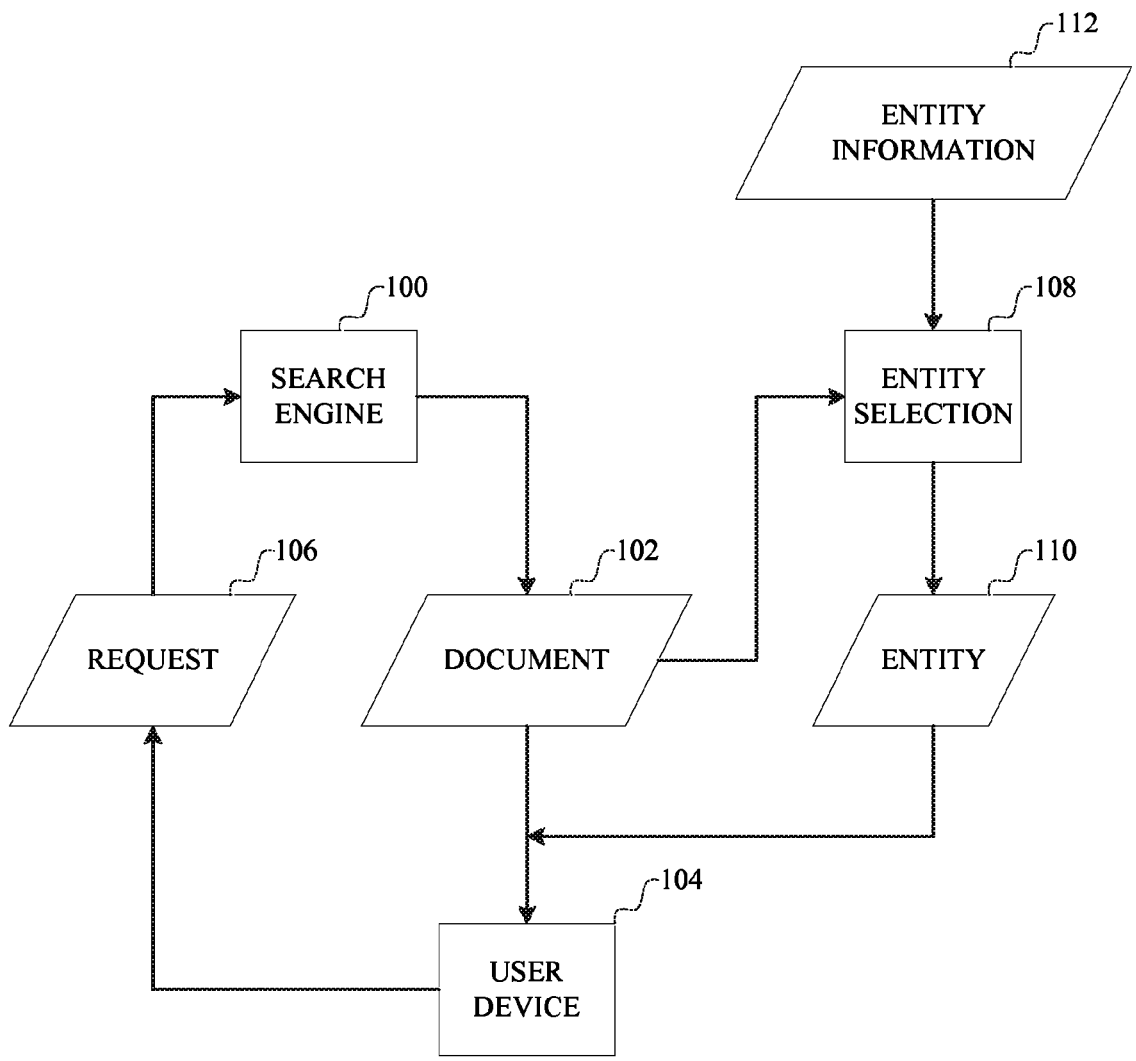
FIG. 1 is a block diagram illustrating an example application in which entity classification can be performed.

Referring to FIG. 1, a search engine 100 provides documents 102 to user devices 104 in response to requests 106. The search engine generally has a searchable index of a large collection of documents, and requests 106 can be in the form of a search query, a document identifier such as a uniform resource locator (URL), or other data that the search engine 100 uses to identify or retrieve documents.

The search engine can be implemented on one or more server computers, accessible to user devices 104 over a computer network. The computer network can be publicly accessible, such as the internet, or private. The user device 104 can be any type of computing device capable of accessing the search engine, such as a mobile phone, handheld computer, laptop computer, notebook computer, desktop computer, and the like. A user device can have a client application, such as a web browser, that is used to communicate with the server computer. The invention is not limited to a specific kind of search engine, user device, request format, document format, or computer network.

A document(s) 102 that can be returned by the search engine also is input to an entity selection module 108. The entity selection module 108 identifies an entity 110 with which the document is associated based on entity information 112. In particular, the entity information 112 includes data that defines how a document can be processed to associate it with a known entity. As an example, the search engine can provide one or more documents 102 to the user device 104 along with an indication of an entity 110 which has been determined to be related to the document 102. The indication of the entity 110 could include a user profile, or data from a user profile, or a user's web page, or a web page about the user, for example, whether the user is a person, organization or location.

Given this context, an example implementation of the entity selection module will be described in more detail in connection with FIGS. 2-5.

Figure 2:
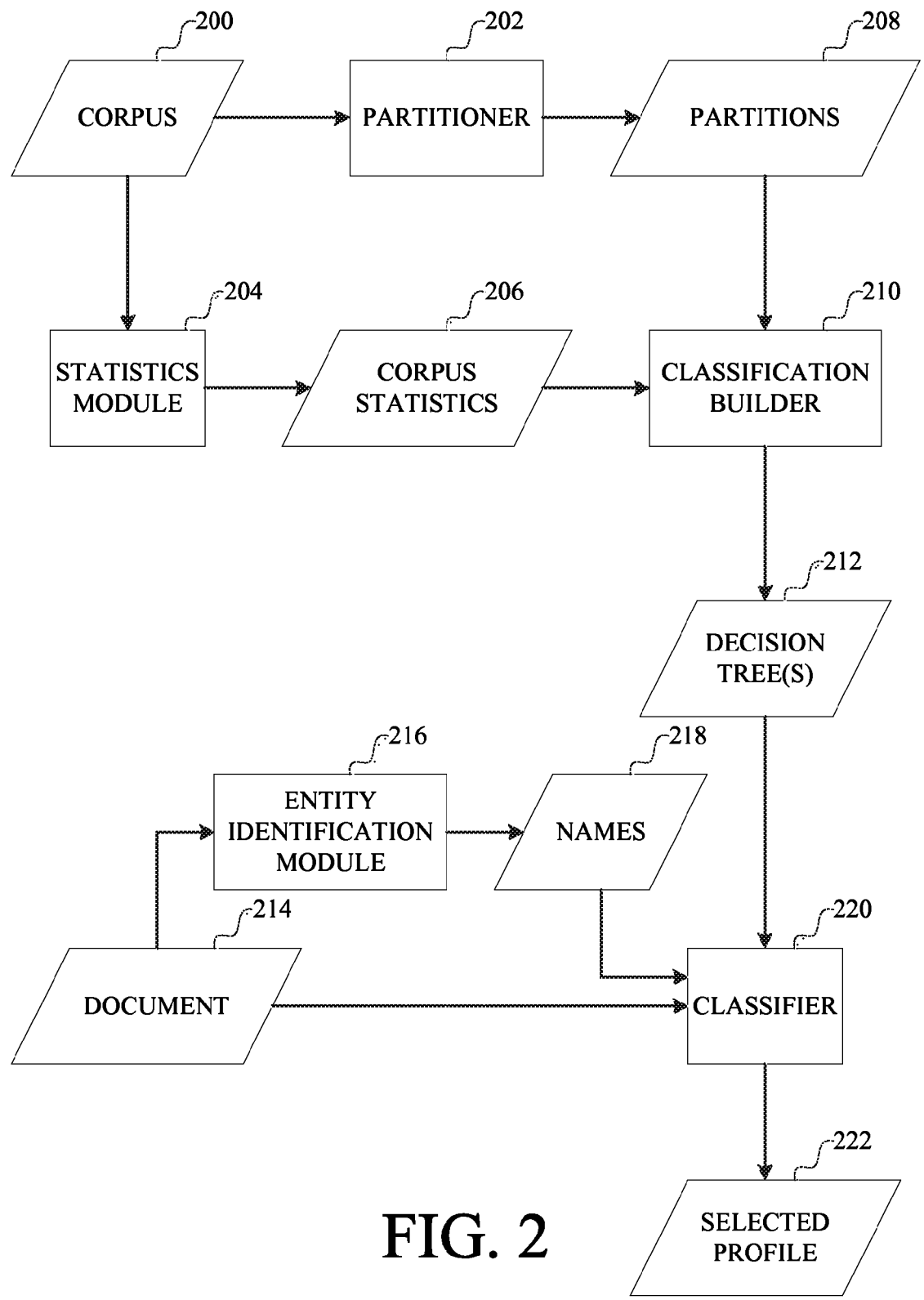
FIG. 2 is a data flow diagram illustrating an example implementation of entity classification.

In FIG. 2, a dictionary, such as a corpus 200 of profiles of entities, is used to create a classifier. In this example, the corpus is a set of profiles of specific entities, such as user profiles. User profiles from a large system, such as the Bing, Windows Live, LinkedIn, MySpace, Facebook, Wikipedia, and The Internet Movie Database (IMDB) online services, or other online system, provides a large corpus to work with. Other dictionaries can include, but are not limited to, a set of profiles of people and businesses in an online directory, articles in an encyclopedia, or other collection of documents associated with entities.

The corpus 200 is input to a partitioner 202, which divides the corpus by names into partitions 208. For example, a partition for "Michael Smith" includes all documents, such as profiles, that include the entity "Michael Smith". For example, the partition Q_n is the set of profiles where the person's name is n. While the partitioning can occur statically prior to a user search on a search engine (see FIG. 1), the partition also can occur dynamically in response to the search query terms. For example, an ambiguous query of "M. Smith" can return a partition of all profiles matching "M. Smith" such as "Michael Smith" and "Margaret Smith."

The corpus 200 also is processed by a statistics module 204, to provide corpus statistics 206. In particular, for each token t, a value of C_t is computed, which is the number of profiles that contain the token t.

The corpus statistics 206 and the partitions 208 are input to a classification builder 210, which constructs a classifier, such as a decision tree 212, for each partition. The construction of a decision tree is described in more detail below in connection with FIG. 3-4.

Given a document 214, an entity identification module 216 identifies the names 218 of people and other entities in the document. The document 214 and the names 218 are input to a classifier 220, which applies the decision tree(s) 212 for the given name(s) 218 to the content of document 214. The output 222 of the classifier 220 identifies which of the selected profiles (from the original corpus 200) to which the document is most related.

Figure 3:
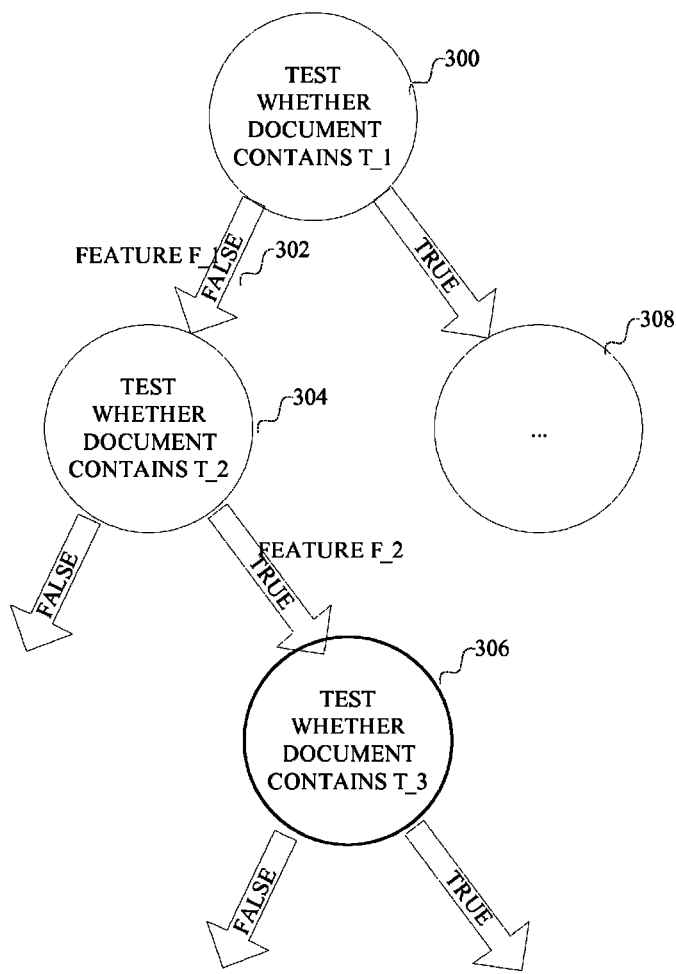
FIG. 3 describes an example decision tree for an entity.

A decision tree implements a sequence of tests to classify a document based on a set of features, each features indicating whether the document contains a token, t_n. As shown in FIG. 3, a decision tree applies a first test 300 of whether a document contains a token t_1. Whether the document does contain this token can be represented by a binary variable, such as "true" or "false", or "0" or "1", which is called feature f_1, as indicated at 302. Thus for each token t_n there is a corresponding feature f_n for a document indicating whether the document contains that token. Based on the value of each feature, a decision tree is traversed. For example, if feature f_1 is "false", then the second test 304 is applied to test whether the document includes token t_2. Additional tests, e.g., 306 and 308, can be applied until the decision tree is traversed for the document.

A token may be a semantic token. That is, rather than testing for a specific name, the test could be for any word or words, including misspellings, that are deemed to mean the same thing.

A feature can be n-ary instead of binary. For example, if structured data is being used, such as with a database, or key-value pairs, instead of applying a binary test of whether a token appears, one could have an n-ary test based on the values available in a field of structured data. An example test is "what university did this person attend?" The n branches from this node would include a list of all universities attend by people with profiles in this partition. Using this approach with structured data allows the appearance of conflicting tokens to be used as a negative result, e.g., a feature of "University='Harvard'" can be given a negative result if a university field for an entity is "Yale." Using structured data in this manner can lead to shallower trees.

Figure 4:
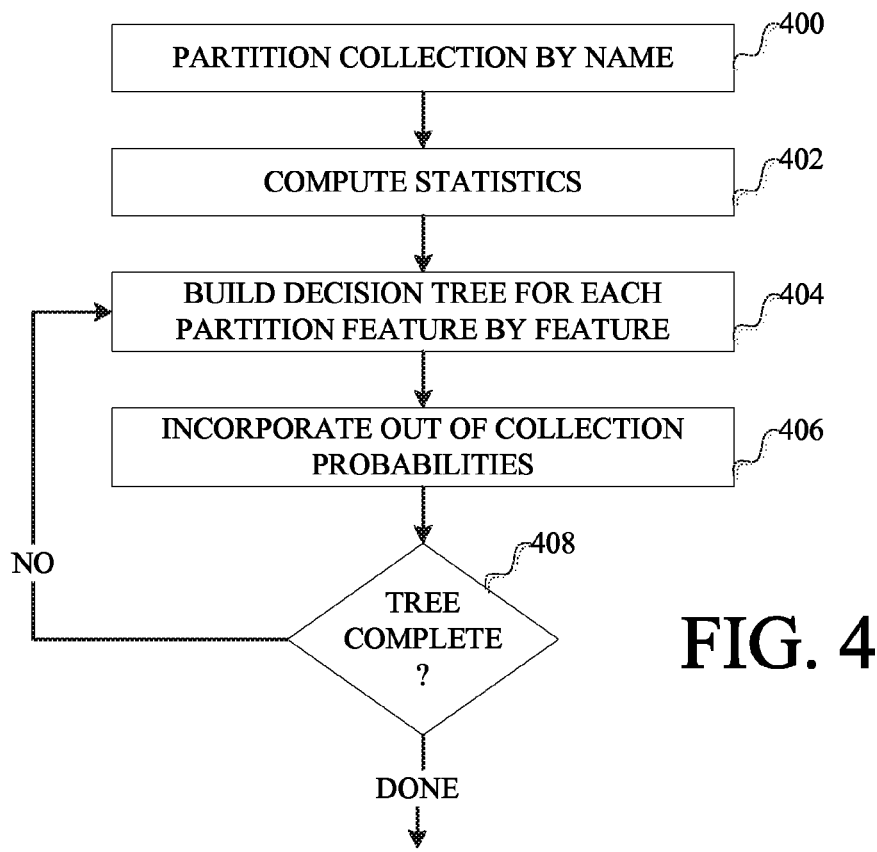
FIG. 4 is a flow chart describing how decision trees are created.

Given a corpus of a set of profiles (200 in FIG. 2), such a decision tree can be built in the following way. Referring to FIG. 4, the corpus is partitioned 400 by name. Also, the statistics for the corpus are computed 402, as described above. A tree is built 404 for each partition. Using standard decision tree building techniques, features are chosen based on entropy reduction. In other words, the feature most likely to evenly divide the set at each node is used as the feature for that node. Next, the entropy at a given node in the tree is determined 406 as a function of the combination of the probability of a match given the known profiles in the partition, or the "observed probability," with the probability of a match given the "out-of-collection" estimates for entities that are not in the corpus, or the "estimated global probability." This process repeats iteratively, as shown at 408, until there are no more features to test, or until a predetermined limit on tree depth is reached, or until the sufficient disambiguation among the profiles has been obtained.

The probability of a match given the known profiles in the partition is calculated in the following manner. At any given node in the decision tree, a set of features F={f_1, . . . , f_k} has been tested, where each feature f_i is a test of whether or not profiles include a token t_i. The probability of a match to a specific entity given the known profiles in the partition=

$$\frac{1}{C_{1...k}}$$

where $C_{1...k}$ is the count of profiles in the dictionary matching the combination of all features F. Intuitively, as more features are tested, fewer entities pass the tests, and the probability of a match increases. As a simple extension, a weighted probability of a match can be calculated given prior estimates of profile probabilities.

The combination of the out of collection probabilities at 406 can be achieved in the following manner.

At any given node in the decision tree, a set of features F={f_1, . . . f_k} has been tested, where each feature f_i is a test of whether or not profiles include a token t_i. The number of profiles in the larger population (e.g., all people) that both have the same name and pass all tests F is estimated. This estimate=|G|*P('name')*P(f_1)* . . . *P(f_k), where:

|G| is the estimated size of the larger population, both including and in addition to the corpus, P('name') is the probability of an entity having the same name, and P(f_i) is the probability of an entity passing the feature test f_i.

Empirically, count-based estimates can be used for P('name')=|Q|/|C| [size of partition/size of corpus]. Also, P(f_i)=|C_i|/|C| if f_i is a positive test or P(f_i)=1−|C_i|/|C| if f_i is a negative test. Each node in the decision tree is annotated with the probability that a document that matches the features f_i is referencing each specific profile in the partition, in the context of the out-of-collection data.

As an example, in FIG. 3, the estimate of the total number of profiles in the world, at the point in the decision tree represented by the node 306, is |G_match|=|G|*P('name')*P(f_1)*P(f_2)==>|G|*|Q|/|C|*(1−|C_1|/|C|)*(|C_2|/|C|). In this example, f_1 represents the test where token t_1 is not contained in the document and f_2 represents the test where token t_2 is contained in the document. Then, the probability of a match given only the "out-of-collection" estimates=1/|G_match|.

These estimates assume that each feature F_i (also t_i) is independent. However, features typically are not independent. Thus, a straightforward extension would be to estimate and model dependencies between features in our probability estimates. In this case, an estimate of the number of matching profiles in the larger population is: $|G|P(name)\Pi_{f \in F}P(f|F^{-f})$ where |G| and P(name) are defined as above, $F^{-f}$ is the set of features in F on which f depends, and $P(f|F^{-f})$ is the dependent probability of f given $F^{-f}$. A simple way to estimate dependent probabilities based on pair-wise probabilities would be to assert an ordering on the features in F and define $F^{-fj}$ as the set of features coming before f in this ordering, in which case $P(f|F^{-f}) \approx \mathrm{argmax}_{g \in F^{-f}} P(f|g)$. Alternatively, another technique would be use a dimensionality reduction in our feature set using principal component analysis (PCA) or other known technique.

After the estimated number of matching profiles in the larger population has been calculated, there are two probability estimates that are combined 1) the probability of a match given the known profiles in the partition; and 2) the probability of a match given the "out-of-collection" estimates. These two estimates can be combined as follows: $P_{combined} = \lambda P_{observed} + (1-\lambda) P_{estimated\ global}$.

While this example in FIGS. 2-3 uses a decision tree to define how each partition is processed, the invention is not limited to a decision tree. Other types of classification processes, such as k-nearest neighbors, logistic regression or interpretable neural networks, can be used to classify documents and associate a document with an entity if the classifier's result can be interpreted, i.e., the features F that contributed to a result can be extracted. This ability to extract these features enables the out-of-collection estimate to be calculated. For some classification algorithms, the ability to identify the features F that most contributed to a classification output can be provided by a simple extension to the algorithm. For example, in the k-nearest-neighbors algorithm, the feature axes along which an item is closest to its neighbors may be used.

Figure 5:
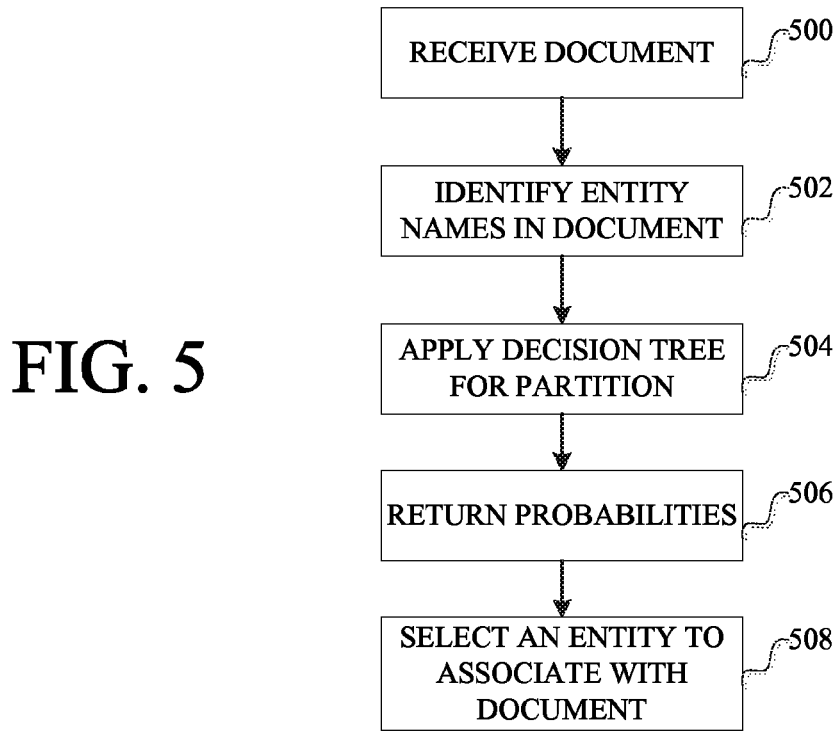
FIG. 5 is a flow chart describing how a document is associated with an entity.

Having now described how a classifier for a partition can be built taking into account out-of-collection probabilities, the application of such classifiers to documents will now be described in more detail in connection with FIG. 5.

After receiving 500 a document, the partition(s) to which the document is applicable are identified 502. In particular, the names for entities are extracted from the document and the classifier for each name is retrieved.

The classifier for an identified partition is applied 504 to the document. Primarily, the decision tree is traversed in a typical manner by applying the test at each node in the decision tree starting at the root, and traversing to the left or the right of the tree depending on whether the test fails or succeeds. The decision tree is built on the assumption that the tokens being tested are known to be related specifically to the person name referenced. However, there are many cases where a document might include a token that is not related to a person or where a document may not include a token that is related to a person referenced in the document. For this reason, as tokens are tested at each node of the decision tree, the final result is smoothed across the left and right branches of the tree at each node based on prior probability of the token in the web as a whole. As an alternative, smoothing can be calculated based on the proximity of the token to the location of the name, or the semantic proximity of the token to the name (e.g., based on grammar) or other contextual clues.

A probability is returned 506 for each entity in the partition, indicating a likelihood that the document is associated with the entity. These probabilities can be used to select 508 an entity to associate with the document. A high level of confidence can be associated with this selection if the probability of an out of collection entity being selected is less than 1.

Having now described an example implementation, a computing environment in which such a system is designed to operate will now be described. It should be understood that building a classifier based on a dictionary, and the application of the classifier to documents can be done in separate computing environments.

The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
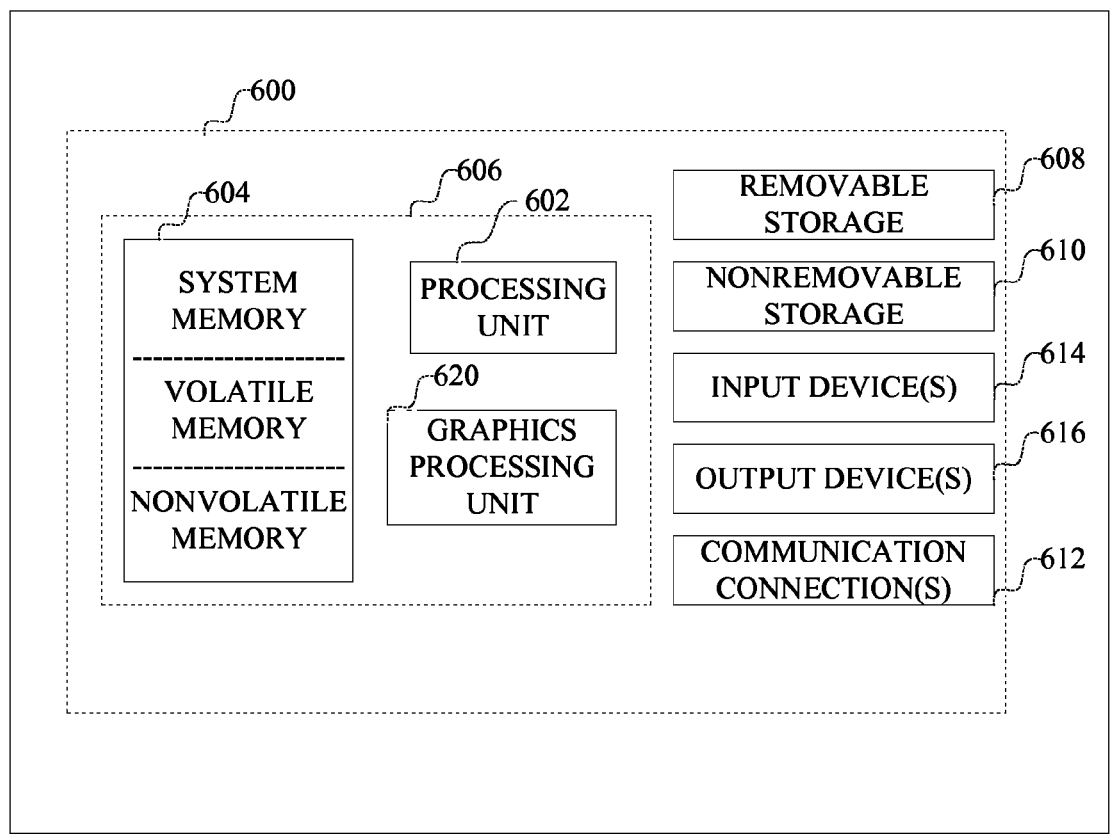
FIG. 6 is a block diagram of an example computing device in which such a system can be implemented.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computing environment includes a computing machine, such as computing machine 600. In its most basic configuration, computing machine 600 typically includes at least one processing unit 602 and memory 604. The computing device may include multiple processing units and/or additional co-processing units such as graphics processing unit 620. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, computing machine 600 may also have additional features/functionality. For example, computing machine 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 600. Any such computer storage media may be part of computing machine 600.

Computing machine 600 may also contain communications connection(s) 612 that allow the device to communicate with other devices. Communications connection(s) 612 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 600 may have various input device(s) 614 such as a display, a keyboard, mouse, pen, camera, touch input device, and so on. Output device(s) 616 such as speakers, a printer, and so on may also be included. All of these devices are well known in the art and need not be discussed at length here.

Such a system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process for building a classifier for associating an entity with a document, comprising:
    accessing a dictionary that maps entities to related terms;
    partitioning the dictionary by entity names to provide a set of partitions, each partition relating to an entity name;
    estimating, for a partition, a probability that is a function of a. a probability that an entity has the entity name related to the partition and b. an estimated size of a population larger than the dictionary; and
    creating a classifier for the partition including the estimated probability.

2. The computer implemented process of claim 1, wherein the classifier is interpretable.

3. The computer implemented process of claim 2, wherein the classifier is a decision tree.

4. The computer implemented process of claim 3, wherein the decision tree includes at least one node having a probability incorporating the estimated probability that an entity has the entity name for a partition but is not represented in the dictionary.

5. The computer implemented process of claim 4, wherein the probability incorporating the estimated probability is computed by $|G|*P(\text{'name'})*P(f\_1)* \ldots *P(f\_k)$, where $|G|$ is an estimated size of a larger population, both including and in addition to the dictionary, $P(\text{'name'})$ is a probability of an entity having a same name, and $P(f\_i)$, where i is an integer from 1 to k, is a probability of an entity passing a feature test $f\_i$.

6. The computer implemented process of claim 5, wherein $P(f\_i)$ is a dependent probability of an entity passing the feature test $f\_i$ given one or more features on which the feature test $f\_i$ depends.

7. The computer implemented process of claim 2, wherein the probability incorporating the estimated probability is computed by $|G|*P(\text{'name'})*P(f\_1)* \ldots *P(f\_k)$, where $|G|$ is an estimated size of a larger population, both including and in addition to the dictionary, $P(\text{'name'})$ is probability of an entity having a same name, and $P(f\_i)$, where i is an integer from 1 to k, is a probability of an entity passing a feature test $f\_i$.

8. The computer implemented process of claim 7, wherein $P(f\_i)$ is a dependent probability of an entity passing the feature test $f\_i$ given one or more features on which the feature test $f\_i$ depends.

9. A computing machine comprising:
    a partitioner having an input for receiving a dictionary of documents related to entities and an output providing a set of partitions, each partition relating to an entity name;
    a statistics module having an input for receiving the dictionary and an output providing statistics regarding terms used in the dictionary;
    a classification builder having an input for receiving data about the partitions and an input for receiving the statistics, and providing data describing a classifier as an output, wherein the classifier incorporates, for at least one of the partitions, an estimated probability that is a function of a. a probability that an entity has the entity name related to the partition and b. an estimated size of a population larger than the dictionary.

10. The computing machine of claim 9, wherein the classifier is interpretable.

11. The computing machine of claim 10, wherein the classifier is a decision tree.

12. The computing machine of claim 11, wherein the decision tree includes at least one node having a probability incorporating the estimated probability that an entity has the entity name for a partition but is not represented in the dictionary.

13. The computing machine of claim 12, wherein the probability incorporating the estimated probability is computed by $|G|*P(\text{'name'})*P(f\_1)* \ldots *P(f\_k)$, where $|G|$ is an estimated size of a larger population, both including and in addition to the dictionary, $P(\text{'name'})$ is a probability of an entity having a same name, and $P(f\_i)$, where i is an integer from 1 to k, is a probability of an entity passing a feature test $f\_i$.

14. The computing machine of claim 13, wherein $P(f\_i)$ is a dependent probability of an entity passing the feature test $f\_i$ given one or more features on which the feature test $f\_i$ depends.

15. The computing machine of claim 10, wherein the probability incorporating the estimated probability is computed by $|G|*P(\text{'name'})*P(f\_1)* \ldots *P(f\_k)$, where $|G|$ is an estimated size of a larger population, both including and in addition to the dictionary, $P(\text{'name'})$ is a probability of an entity having a same name, and $P(f\_i)$, where i is an integer from 1 to k, is a probability of an entity passing a feature test $f\_i$.

16. The computing machine of claim 15, wherein $P(f\_i)$ is a dependent probability of an entity passing the feature test $f\_i$ given one or more features on which the feature test $f\_i$ depends.

17. A computer-implemented process for associating an entity with a document, comprising:
    accessing a classifier associated with an entity name in the document, wherein the classifier incorporates an estimated probability that is a function of a. a probability that an entity has the entity name related to the partition and b. an estimated size of a population larger than the dictionary; and
    applying the classifier to the document to obtain probabilities that the document is associated with specific entities having the entity name.

18. The computer implemented process of claim 17, further comprising selecting an entity from among the specific entities according to the probabilities.

19. The computer implemented process of claim 18, wherein the classifier is a decision tree including at least one node having a probability incorporating the estimated probability that an entity has the entity name for a partition but is not represented in the dictionary.

20. The computer implemented process of claim 17, further comprising identifying the document in response to a user query on a database of documents separate from the dictionary.

* * * * *